United States Patent [19]

Mayher et al.

[11] 4,230,960
[45] Oct. 28, 1980

[54] FLEXIBLE MOUNTING FOR AN END-SUPPORTED STATOR CORE

[75] Inventors: James M. Mayher, West Mifflin; Andrew S. Ying, Monroeville, both of Pa.

[73] Assignee: Westinghouse Electric Corp., Pittsburgh, Pa.

[21] Appl. No.: 965,007

[22] Filed: Nov. 30, 1978

[51] Int. Cl.³ .............................................. H02K 5/24
[52] U.S. Cl. ..................................... 310/51; 310/258; 248/603
[58] Field of Search ................... 310/260, 258, 51, 91, 310/182, 183, 89, 254, 259; 248/603, 606, 607

[56] References Cited

U.S. PATENT DOCUMENTS

| | | | |
|---|---|---|---|
| 2,554,226 | 5/1951 | Taylor | 310/51 UX |
| 2,720,600 | 10/1955 | Pollard | 310/51 |
| 2,953,697 | 9/1960 | Wall | 310/51 |
| 3,395,296 | 7/1968 | Cohen | 310/258 |
| 3,519,857 | 7/1970 | Plumb | 310/258 |
| 3,987,325 | 10/1976 | Wilson | 310/258 |
| 4,051,399 | 9/1977 | Stanwick | 310/51 |

FOREIGN PATENT DOCUMENTS 594560 2/1978 U.S.S.R. ................................... 310/51

Primary Examiner—R. Skudy
Attorney, Agent, or Firm—J. W. Keen

[57] ABSTRACT

The stator core of a dynamoelectric machine is end-supported by a flexible mounting which includes bore rings encircling the stator core at spaced-apart locations. Outer and inner plate springs extend independently along each exterior side of the stator core within the horizontal center plane thereof to independently interconnect the bore rings with end boxes. The outer springs are joined to one or more bore rings arranged between other bore rings at the middle part of the stator core and the inner springs are joined to at least one bore ring at the end of the stator core. A plate spring is used as a stabilizer to extend between the end boxes below the stator core within the vertical center plane thereof to join the bore rings to the end boxes. The bore rings have flat peripheral surfaces for attachment to each of the springs.

8 Claims, 3 Drawing Figures

FLEXIBLE MOUNTING FOR AN END-SUPPORTED STATOR CORE

BACKGROUND OF THE INVENTION

This invention relates to a flexible mounting for an end-supported stator core in a dynamoelectric machine, and more particularly to a construction of parts to employ end boxes for the entire mounting of a horizontal stator core in a horizontal direction while attenuating double-frequency bending vibrations of the stator core.

The practice of attenuating radial vibrations of a stator core is known in the art and is typically accomplished by employing either vertically-flexible springs or horizontally-flexible springs between the stator core and an adjacent frame along the entire length of the stator core. According to other known practices, an end-supported mounting for a stator core is achieved through the use of one or two rings for a stator core of a dynamoelectric machine of a relatively low rating. When more than one pair of rings is required as, for example, in a relatively long dynamoelectric machine, the intermediate rings are connected to an outer frame which extends along the complete length of the stator core. In these known constructions, the practices of attenuating radial vibration of a stator core demand the use of a radially-outward adjacent structure to support the core radially along the complete length of the core. Such support is necessary to allow all sections of the stator core to circumferentially rotate the same distance during a short-circuit condition. These support arrangements eliminate slippage between punchings and subsequent stator core and coil insulation damages. However, these known arrangements are not usefully applicable and economical to dynamoelectric machines of moderate power ratings such as in an air-cooled medium turbine generator.

SUMMARY OF THE INVENTION

It is an object of the present invention to provide a flexible mounting for an end-supported stator core in a dynamoelectric machine to achieve through the stator core mounting, support for the weight of the stator core, support to resist steady-state and short-circuit torques and support to minimize the transmission of double-frequency bending vibrations of the stator core to the support structure.

It is a further object of the present invention to provide in a dynamoelectric machine, a simple and economical flexible mounting for a horizontal stator core in a horizontal direction.

It is another object of the present invention to eliminate the need for a coextending outer support frame and an accompanying foundation extending about and underneath the stator core of a dynamoelectric machine by providing a flexible mounting for a totally, end-supported stator core through the utilization of support therefor by end boxes of the dynamoelectric machine.

More particularly, according to the present invention, there is provided a flexible mounting for an end-supported stator core in a dynamoelectric machine comprising the combination of a plurality of bore rings encircling the stator core at coaxially, spaced-apart locations therealong, end boxes each including a support ring to support one of the opposite ends of the stator core, outer and inner springs extending independently at each side of the stator core within the horizontal center plane thereof to independently interconnect the bore rings with a support ring of the end boxes, the springs defining a resiliency radially of the stator core to isolate double-frequency core vibrations and a stiffness tangentially of the stator core to resist a short-circuit torque, a bore ring at the middle part of the stator core being joined by an outer spring at each side of the stator core to an end box and a bore ring at the end part of the stator core being joined by an inner spring at each side of the stator core to an end box, and a stabilizer extending between the bore rings to the end boxes below the stator core within the vertical center plane thereof.

In the preferred form of the present invention, the outer and inner springs as well as the stabilizer comprise flat plate springs. The inner spring may take the form of two separate spring members having a relatively short length to extend between an individual end box and a bore ring at an end part of the stator core. The outer spring at either side of the stator core may also take the form of two separate spring members each having a suitable length to extend between an individual end box and a bore ring at the middle part of the stator core. The bore rings have flat peripheral surfaces for attachment to the springs which have spring constants defined to support the bore rings with substantially the same circumferential deflection under a short-circuit condition. The outer and inner springs are independent of one another and the outer spring has a longer effective length and is stiffer than the inner spring.

These features and advantages of the present invention as well as others will be more fully understood when the following description is read in light of the accompanying drawings, in which.

Figure 1:
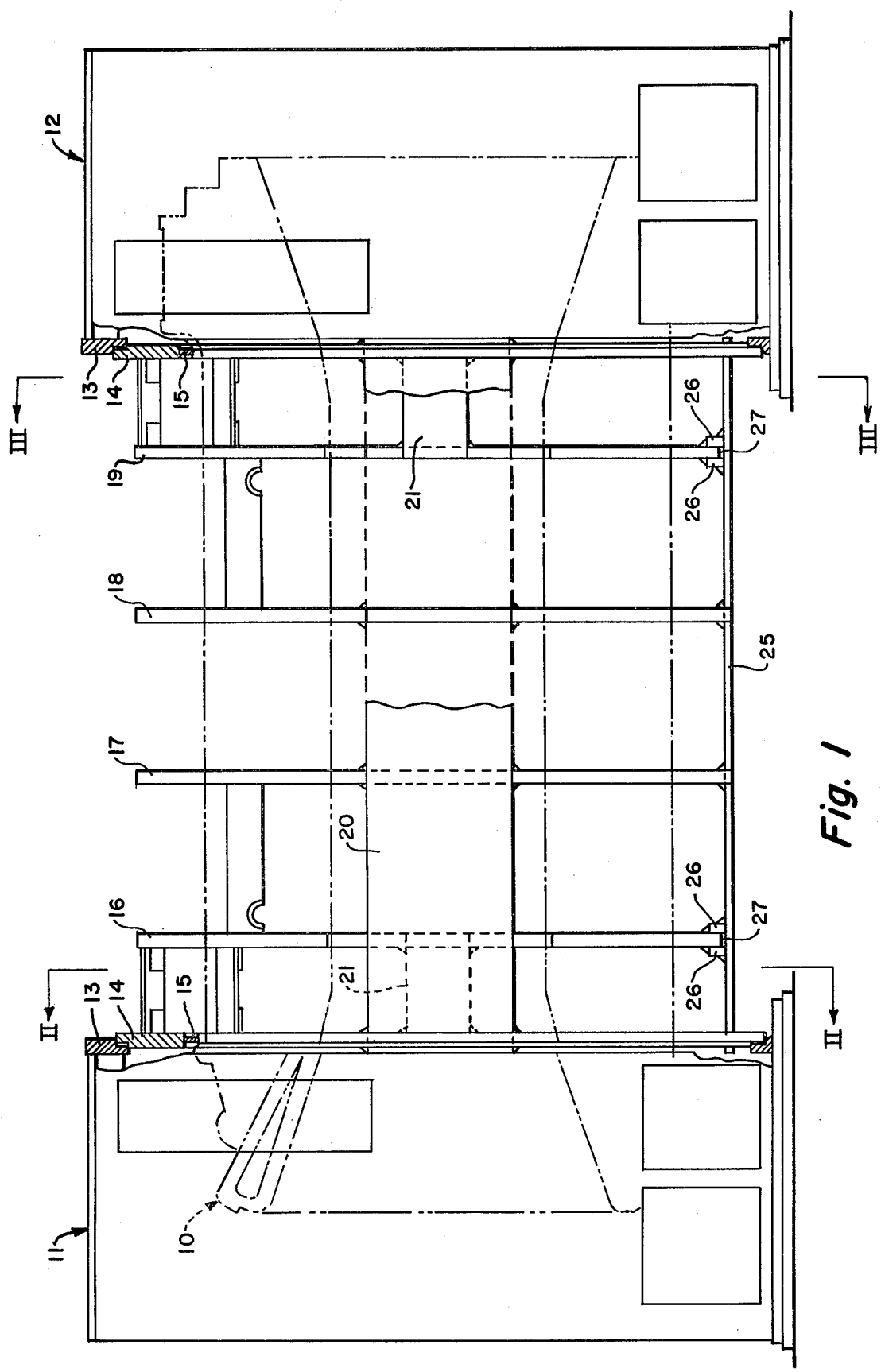
FIG. 1 is a side elevational view showing the arrangement of parts for providing an end-supported, flexibly-mounted stator core according to the present invention.
Figure 2:
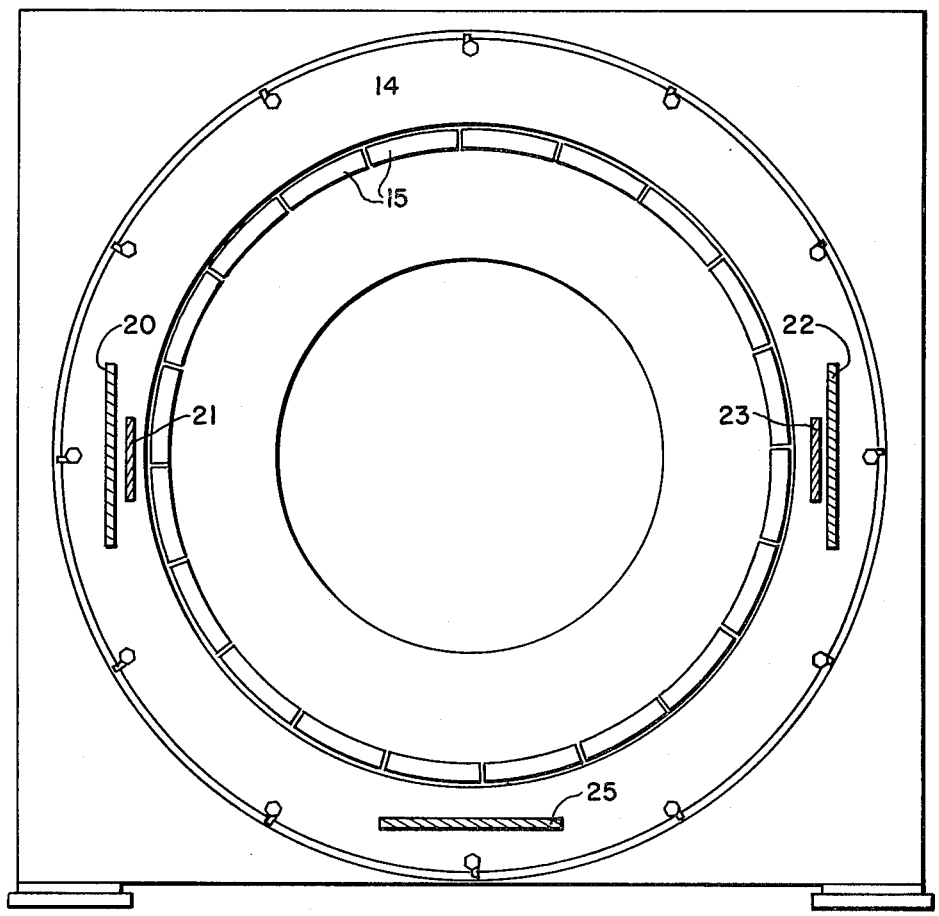
FIG. 2 is a sectional view taken along line II—II of FIG. 1.
Figure 3:
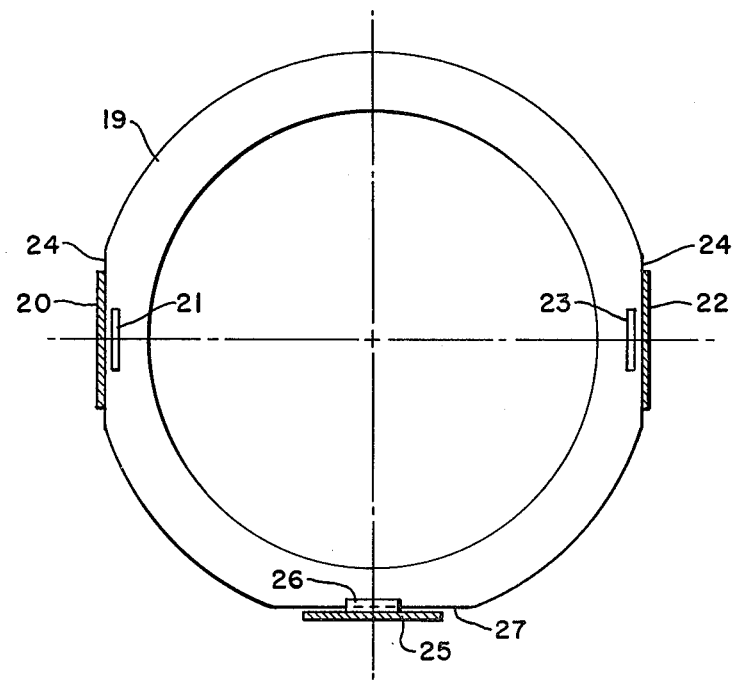
FIG. 3 is a sectional view taken along line III—III of FIG. 1.

In FIG. 1, there is illustrated a stator core support system embodying the features of the present invention. The familiar stator core is shown by phantom lines and indicated by reference numeral 10. The mounting for the stator core of the present invention is particularly useful for air-cooled medium turbine generators with an end-supported structure. An end box 11 is arranged at the exciter end of the stator core and an end box 12 is arranged at the turbine end of the stator core. The end boxes are rigidly held down by foundation bolts. As shown in FIGS. 1 and 2, the end boxes each includes a support ring 13 which is joined by threaded bolts and welds, as desired, to end rings 14. Baffle ring segments 15 are interposed between the stator core and each end ring 14. A plurality of bore rings encircle the stator core at coaxially, spaced-apart locations and project radially therefrom. In FIG. 1, there are four bore rings 16–19. Bore ring 19 is also shown in FIG. 3. The usual building bolts, not shown, are welded to the inside diameter of the bore rings 16–19 to form a stiff support frame. Punchings are stacked on top of each other over the building bolts inside the bore rings. The punchings are clamped together by through-bolts to form a core system that is supported entirely by the end boxes through the use of springs. As shown in FIGS. 1–3, extending along the horizontal center plane at the exterior side of the stator core is a vertically-arranged outer plate spring 20 and an inner plate spring 21 at one side of the stator core and at the other side of the stator core, an outer plate spring 22 and an inner plate spring 23 are similarly arranged. These plate springs extend independently of one another to interconnect the bore rings with end rings 14 of the end boxes. Plate springs 20 and 22 are joined by welds or the like to the bore rings 17 and 18 along flat peripheral edge surfaces 24 on the outside diameter thereof. Flat peripheral edge surfaces 24 are also disposed on the outside diameter of bore rings 16 and 19 to provide clearance from and avoid interference with the plate springs 20 and 22 as illustrated in FIG. 3. Plate springs 21 and 23 are joined by welds or the like to bore rings 16 and 19. These bore rings have suitably dimensioned slots to receive the springs. If desired, the springs 21 and 23 are also joined by welds to bore rings 17 and 18 by providing suitably dimensioned slots therein. It is within the scope of the present invention to employ two short plate spring members at each side of the stator core instead of a single plate spring 21 or 23. When two short plate spring members are used, one spring member extends between bore ring 16 and end ring 14 of end box 11 and the second spring member extends between bore ring 19 and end ring 14 of end box 12. Moreover, it is immaterial whether the outer springs 20 and 22 extend continuously between bore rings 17 and 18.

Plate springs 20-23 are radially flexible to effectively isolate double-frequency stator core vibrations and are stiff, tangentially to the stator core, to resist short-circuit and operating torques. It is preferred to use a minimum number of bore rings, but excessive stresses upon any single ring must be avoided and all bore rings are designed to equally resist the short-circuit torque. This is achieved according to the present invention because all rings are independently supported by either long or short springs to the end boxes. The number of bore rings and their axial positions can be determined by the maximum unsupported length of the stator core between two consecutive bore rings to prevent interlaminar slipping with the stator core.

The spring constants of springs 20 and 22 as compared with springs 21 and 23 are approximately the same. However, the spring constants are selected to provide support with the same circumferential deflection under short-circuit conditions without overstressing any spring. This feature allows all sections of the stator core to rotate the same amount, eliminates core punching slippage and allows the total short-circuit torque to be transmitted by the punchings. The springs are stiff in the circumferential direction but flexible in the radial direction. Springs 20 and 22 have a longer effective length and are wider than springs 21 and 23.

It is immaterial whether springs 21 and 23 are connected to bore rings 17 and 18 at the middle portion of the stator core. However, the springs 20 and 22 must not be connected to bore rings 16 and 19 at the end portions of the stator core. A plate spring 25 is used as a stabilizer and is generally made similar to springs 20 and 22, although it is not so required. Bore rings 17 and 18 are welded to plate spring 25. Side plates 26 are used to interconnect bore rings 16 and 19 with spring 25 which extends along the vertical center plane of the stator core. The bore rings 16-19 include flat peripheral edge surfaces 27 for attachment to spring 25. It is to be understood that while four bore rings are shown and described, at least three bore rings are necessary, but four or more may be utilized without departing from the spirit and scope of the present invention.

Although the invention has been shown in connection with a certain specific embodiment, it will be readily apparent to those skilled in the art that various changes in form and arrangement of parts may be made to suit requirements without departing from the spirit and scope of the invention.

We claim:

1. A flexible mounting for an end-supported stator core in a dynamoelectric machine comprising the combination of:

a plurality of bore rings encircling the stator core at coaxially, spaced-apart locations therealong, an end box disposed at each end of the stator core, outer and inner springs extending independently at each exterior side of the stator core within the horizontal center plane thereof to independently interconnect the bore rings with the end boxes, said springs defining a resiliency radially of the stator core to isolate double-frequency core vibration and a stiffness tangentially to the stator core to resist a short-circuit torque, each outer spring being joined to a bore ring disposed axially between other bore rings, and each inner spring being joined to a bore ring at one end of the stator core, and a stabilizer joined to the bore rings and extending between the end boxes below the stator core within the vertical central plane thereof.

2. The combination according to claim 1 wherein said outer and inner springs comprise flat plate springs.

3. The combination according to claim 1 wherein said stabilizer comprises a flat plate spring.

4. The combination according to claim 1 wherein each of said inner springs comprises two flat plate spring members respectively joined to bore rings at opposite ends of the stator core for support by said end boxes.

5. The combination according to claim 1 wherein said outer springs have a substantially greater effective length as compared with the effective length of the inner springs.

6. The combination according to claim 1 wherein the outer and inner springs have spring constants defined to support the bore rings with substantially the same circumferential deflection under a short-circuit condition of the dynamoelectric machine.

7. The combination according to claim 1 wherein said bore rings have flat peripheral surfaces for attachment to said springs.

8. The combination according to claim 1 wherein said bore rings have flat peripheral surfaces for attachment to said stabilizer.

* * * * *